United States Patent [19]

Colle et al.

[11] Patent Number: 5,583,273
[45] Date of Patent: *Dec. 10, 1996

[54] METHOD FOR INHIBITING HYDRATE FORMATION

[75] Inventors: Karla S. Colle; Russell H. Oelfke, both of Houston, Tex.

[73] Assignee: Exxon Production Research Company, Houston, Tex.

[*] Notice: The term of this patent shall not extend beyond the expiration date of Pat. No. 5,491,269.

[21] Appl. No.: 448,698

[22] Filed: May 24, 1995

Related U.S. Application Data

[63] Continuation-in-part of Ser. No. 306,331, Sep. 15, 1994, Pat. No. 5,491,269.
[51] Int. Cl.$^6$ ................ C07C 7/00; C07C 7/20
[52] U.S. Cl. ............ 585/15; 585/950; 166/310; 166/371; 137/3; 137/13
[58] Field of Search .............. 585/15, 950; 166/310, 166/371; 137/3, 13

[56] References Cited

U.S. PATENT DOCUMENTS

| | | | |
|---|---|---|---|
| 3,741,961 | 6/1973 | Kmiecik et al. | 260/243 R |
| 4,203,900 | 5/1980 | Kaiser | 548/239 |
| 4,354,029 | 10/1982 | Kaiser et al. | 548/239 |
| 4,856,593 | 8/1989 | Matthews et al. | 106/310 |
| 4,915,176 | 4/1990 | Sugier et al. | 166/371 |
| 4,973,775 | 11/1990 | Sugier et al. | 585/15 |
| 5,076,364 | 12/1991 | Hale et al. | 166/310 |
| 5,076,373 | 12/1991 | Hale et al. | 175/40 |
| 5,244,878 | 9/1993 | Sugier et al. | 507/90 |
| 5,331,105 | 7/1994 | Duncum et al. | 585/800 |
| 5,491,269 | 2/1996 | Colle et al. | 585/15 |

FOREIGN PATENT DOCUMENTS

| | | |
|---|---|---|
| 0309210A1 | 3/1989 | European Pat. Off. . |
| 0336501A2 | 10/1989 | European Pat. Off. . |
| 0457375A1 | 11/1991 | European Pat. Off. . |
| 0536950A1 | 4/1993 | European Pat. Off. . |
| 0582507A1 | 2/1994 | European Pat. Off. . |
| 0594479A1 | 4/1994 | European Pat. Off. . |
| 2618876 | 2/1989 | France . |
| 1391692 | 4/1988 | U.S.S.R. . |
| 1683807A1 | 10/1991 | U.S.S.R. . |
| 1799286A3 | 2/1993 | U.S.S.R. . |
| PCT/EP3/ 01519 | 12/1993 | WIPO . |
| PCT/US93/ 11191 | 6/1994 | WIPO . |

OTHER PUBLICATIONS

U.S. Patent Application No. 07/979,588 by E. D. Sloan, Jr., filed Nov. 20, 1992.

U.S. CIP Patent Application No. 08/083,108 by E. D. Sloan, Jr., filed Jun. 24, 1993.

"Recent Syntheses and Reactions of Cyclic Imidic Esters," Seeliger et al., *Angew. Chem. Int. Ed.*, vol. 5, No. 10, 875–88 (1966).

"Block Copolymers from Cyclic Imino Ethers: A New Class of Nonionic Polymer Surfactant," Kobayashi et al., *Macromolecules*, vol. 19, p. 535, (1986).

"Influence of the Formation of Crystal Hydrates of Liquids and Gases," Krasnov, Source Not Supplied, No. 81094.4, UDC 622.324.5:661.181.1.002.614, Publication Date Unknown.

"Effect of Surfactants on Hydrate Formation Kinetics," Kalogerakis et al. SPE 1993 International Oilfield Chemistry Symposium (new Orleans, Mar. 2–5, 1993) Proceedings 375–83 (1993).

"Surfactants in Oil Production," Muijs, R. Soc. Chem., (Chemical Oil Ind. Developments & Applications) V 97, 277–97, 1991.

"A Molecular Mechanism for Gas Hydrate Nucleation from Ice," Sloan, et al. AIChE Journal, vol. 37, No. 9, 1281–92, (Sep. 1991).

"Surfactants Studies as Hydrate–Formation Inhibitors," Kuliev et al., Gazovoe Delo (1972), (10), 17–19. (Translation enclosed).

"Effect of Lower Alcohols on Formation of Crystallohydrates of Liquids and Gases," Krasnov, Gazovoe Delo (1966), (12), 9–11 (Translation enclosed).

"Clathrate Hydrates," P. Englezos, Ind. Eng. Chem. Res. 1993, 32, 1251–1274.

"Recent Developments in Gas Dehydration and Hydrate Inhibition," Hubbard et al., SPE 21507, pp. 263–276 (1991).

"Natural Gas Hydrate Phase Equilibria and Kinetics: Understanding the State of the Art," Sloan, Revue De L'Institut Francais Du Petrole, (continued) vol. 45, No. 2, MAR-S–AVRIL 1990. Presented Jun. 8, 1989.

"Selective Polymerization of 2–Isopropenyl–2–oxazoline and Cross–linking Reaction of the Polymers," *Polymer Journal*, T. Kagiya and T. Matsuda, vol. 3, No. 3, 307–314 (1972).

*Primary Examiner*—Asok Pal
*Attorney, Agent, or Firm*—Kurt D. Van Tassel

[57] ABSTRACT

A method for inhibiting the formation of clathrate hydrates in a fluid having hydrate forming constituents is disclosed. More specifically, the method can be used in treating a petroleum fluid stream such as natural gas conveyed in a pipe to inhibit the formation of a hydrate restriction in the pipe. The hydrate inhibitors used for practicing the method are substantially water soluble polymers formed from a cyclic imino ether. Such polymers may be ring closed cyclic imino ether ("CIE") polymers, ring opened CIE polymers, or combinations thereof. Some examples of ring opened CIE polymers include various N-acyl polyalkyleneimines produced by cationic polymerization, such as N-acyl substituted polyethyleneimine, N-acyl substituted polypropyleneimine, N-acyl substituted polybutyleneimine, N-acyl substituted polypentyleneimine and copolymers thereof. Ring closed CIE polymers may be derived from free radical or anionic polymerization of 2-alkenyl-2-oxazolines, 2-alkenyl-2-oxazines, and other cyclic imino ethers having an alkene functional group. Also, such ring closed and ring opened CIE polymers can be copolymerized with other substantially water soluble polymers or used in various ratios with other substantially water soluble polymers and copolymers. Preferably, a solvent such as water, brine, alcohol, or mixtures thereof is used to produce an inhibitor solution or mixture to facilitate treatment of the petroleum fluid stream.

8 Claims, No Drawings

5,583,273

METHOD FOR INHIBITING HYDRATE FORMATION

This application is a continuation-in-part application of application Ser. No. 08/306,331 filed on Sep. 15, 1994, now U.S. Pat. No. 5,491,269.

FIELD OF THE INVENTION

The present invention relates to a method for inhibiting the formation of clathrate hydrates in a fluid. More specifically, the invention relates to a method for inhibiting the formation of gas hydrates in a pipe used to convey oil or gas.

BACKGROUND OF THE INVENTION

Carbon dioxide, hydrogen sulfide, and various hydrocarbons, such as methane, ethane, propane, normal butane and isobutane, are present in natural gas and other petroleum fluids. However, water is typically found mixed in varying amounts with such petroleum fluid constituents. Under conditions of elevated pressure and reduced temperature clathrate hydrates can form when such petroleum fluid constituents or other hydrate formers are mixed with water. Clathrate hydrates are water crystals which form a cage-like structure around guest molecules such as hydrate forming hydrocarbons or gases. Some hydrate forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Some hydrate forming gases include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of the natural gas and other petroleum fluids. For example, at a pressure of about 1 MPa ethane can form gas hydrates at temperatures below 4° C., and at a pressure of 3 MPa ethane can form gas hydrates at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions requires design and equipment modifications, such as insulated or jacketed piping. Such modifications are costly to implement and maintain. The amount of antifreeze required to prevent hydrate blockages is typically between 10% to 20% by weight of the water present in the oil or gas stream. Consequently, several thousand gallons per day of such solvents can be required. Such quantities present handling, storage, recovery, and potential toxicity issues to deal with. Moreover, these solvents are difficult to completely recover from the production or transportation stream.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

One method of practicing the present invention uses gas hydrate inhibitors which can be used in the concentration range of about 0.01% to about 5% by weight of the water present in the oil or gas stream. As discussed more fully below, the inhibitors of this invention can effectively treat a petroleum fluid having a water phase.

SUMMARY OF THE INVENTION

According to the invention there is provided a method for inhibiting the formation of clathrate hydrates in a fluid having hydrate forming constituents. The method comprises treating the fluid with an inhibitor comprising a substantially water soluble polymer produced from a cyclic imino ether. The method can be practiced with a ring closed cyclic imino ether polymer, ring opened cyclic imino ether polymer or combinations thereof.

One embodiment of the invention includes treating the fluid with an inhibitor mixture having (a) an inhibitor comprising a substantially water soluble polymer formed from a cyclic imino ether and (b) a liquid used for introducing the inhibitor into the fluid. Preferably, such liquid is an alcohol, water, brine, or some mixture thereof.

Some inhibitors which can be used to practice the invention include, but are not limited to, substantially water soluble ring opened polymers that can be produced from a N-acyl substituted polyalkeneimine selected from the group consisting of N-acyl substituted polyethyleneimine, N-acyl substituted polypropyleneimine, N-acyl substituted polybutyleneimine, N-acyl substituted polypentyleneimine, and copolymers thereof. Furthermore, the N-acyl substituent for such water soluble polymers can be selected from from the group consisting of a hydrogen, alkyl, alkenyl, aryl, alkaryl, aralkyl, cycloalkyl, and heterocyclic group. The invention can also be practiced using ring closed polymers that can be produced from a cyclic imino ether having an alkene functional group selected from the group consisting of 2-akenyl-2-oxazolines and 2-alkenyl-2-oxazines

DETAILED DESCRIPTION OF THE INVENTION

INVENTIVE METHOD

The inventive method inhibits the formation of clathrate hydrates in a fluid having hydrate forming constituents. Formation of clathrate hydrates means the nucleation, growth, and/or agglomeration of clathrate hydrates. Such clathrate hydrates may be formed in a fluid whether it is flowing or substantially stationary, but are often most problematic in flowing fluid streams conveyed in a pipe. For example, flow restrictions arising from partial or complete blockages in a fluid stream can arise as clathrate hydrates adhere to and accumulate along the inside wall of the pipe used to convey the fluid. Nonetheless, the invention can be used for inhibiting formation of clathrate hydrates in substantially stationary fluids.

In one embodiment of the invention, a concentrated solution or mixture of one or more of the inhibitors of the type described below is introduced into a petroleum fluid stream having an aqueous phase. As the inhibitor solution or mixture of this invention is substantially dissolved in the aqueous phase or dispersed in the fluid stream it reduces the rate that clathrate hydrates are formed, and thereby reduces the tendency for a flow restriction to occur.

In a preferred embodiment, the solid polymer is first dissolved into an appropriate carrier solvent or liquid to make a concentrated solution or mixture. It should be understood that many liquids may effectively facilitate treatment of the fluid stream without dissolving the inhibitor. Many liquids, however, will preferably dissolve the inhibitor and, for convenience, are referred to hereafter as solvents whether they produce an inhibitor solution, emulsion, or other type of mixture. The solvent's principal purpose is to act as a carrier for the inhibitor and to facilitate the inhibitor's absorption into the aqueous phase of the petroleum fluid. Any solvent suitable for delivering the inhibitor to the fluid's aqueous phase may be used. Such solvents include, but are not limited to, water, brine, sea water, produced water, methanol, ethanol, propanol, isopropanol, or mixtures of such solvents. Other solvents familiar to those skilled in the art may also be used.

It should be understood that the use of a carrier solvent is not required to practice the invention, but it is a convenient method of introducing the inhibitor into the fluid. In many applications the use of a carrier solvent will facilitate treatment of the fluid stream.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent, the chemical composition of the inhibitor, the system temperature, and the inhibitor's solubility in the carrier solvent at application conditions.

The inhibitor mixture is introduced into the aqueous phase of the petroleum fluid using mechanical equipment, such as, chemical injection pumps, piping tees, injection fittings, and other devices which will be apparent to those skilled in the art. However, such equipment is not essential to practicing the invention. To ensure an efficient and effective treatment of the petroleum fluid with the inhibitor mixture two points should be considered.

First an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the inhibitor solution's viscosity is sufficiently low to facilitate its dispersion through the fluid and permit it to reach the aqueous phase.

Second, because the inhibitor primarily serves to inhibit the formation of clathrate hydrates, rather than reverse such formation, it is important to treat the fluid prior to substantial formation of clathrate hydrates. As a wet petroleum fluid cools it will eventually reach a temperature, known as the hydrate equilibrium dissociation temperature or $T_{eq}$, below which hydrate formation is thermodynamically favored. A petroleum fluid's $T_{eq}$ will shift as the pressure applied to the fluid and the its composition change. Various methods of determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

The quantity of inhibitor introduced into a petroleum fluid with an aqueous phase solvent will typically vary between about 0.01 wt % to about 5 wt % by weight of the water present in the fluid. Preferably, the inhibitor concentration will be about 0.5 wt %. For example, a laboratory study has shown that adding 0.5 wt % of poly(2-ethyl-2-oxazoline) to a petroleum fluid allowed the fluid to cool to a temperature which was about 7° C. below its $T_{eq}$ without formation of a hydrate blockage. A higher inhibitor concentration can be used to lower the temperature at which a hydrate blockage is obtained. A suitable concentration for a particular application, however, can be determined by those skilled in the art by taking into account the inhibitor's performance under such application, the degree of inhibition required for the petroleum fluid, and the inhibitor's cost.

INHIBITOR DESCRIPTION

Compounds belonging to the group of polymers and copolymers of cyclic imino ethers, and mixtures thereof, are very effective inhibitors of hydrate nucleation, growth, and/ or agglomeration (collectively referred to as hydrate formation). Such cyclic imino ether polymers and copolymers may be produced from one of three polymerization procedures: (1) cationic polymerization that opens the cyclic imino ether ring ("ring opened, CIE polymers"), (2) free radical polymerization that leaves the cyclic imino ether ring closed ("ring closed, CIE polymers") or (3) anionic polymerization that also produces ring closed, CIE polymers.

Ring Opened CIE Polymers

A generic structure for the class of polymers derived from ring opening cationic polymerization of cyclic imino ethers such as 2-alkyl-2-oxazolines, 2-alkyl-2-oxazines, and other alkylated cyclic imino ethers is depicted as follows:

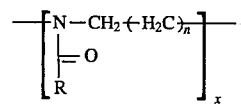

where R is hydrogen or an alkyl, alkenyl, aryl, aralkyl, alkaryl, cycloalkyl, or heterocyclic group such that the resultant polymer is substantially water soluble, n ranges from one to four and x is an average integer sufficient to produce an average molecular weight between about 1,000 to about 1,000,000.

Regarding a polymer's average molecular weight, it is well understood by those skilled in the art that a given polymer composition is comprised of polymers having variable chain lengths and molecular weights, with some above and some below the polymer's average molecular weight. Therefore, some polymer chains contain less than x repeating units and some polymer chains contain more than x repeating units. Accordingly, x represents an average number of repeating units over the distribution of polymer chains comprising a given polymer composition.

A preferred polymer produced from a cationic polymerization or N-acyl substituted polyalkeneimine is poly(2-ethyl-2-oxazoline) (hereinafter referred to as PEOx). For the cationic polymerized structure identified above, n=1, R is an ethyl group, and x=5,050 for PEOx having an average molecular weight of about 500,000.

Copolymers of these cationically polymerized, ring opened CIE polymers (either random or block type AB and ABA copolymers) are also effective inhibitors of hydrate nucleation, growth, and/or agglomeration. An example of a block copolymer of 2-alkyl-2-oxazoline is depicted as follows:

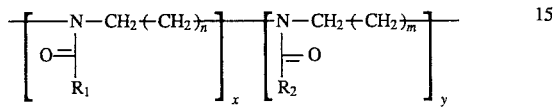

where $R_1$ and $R_2$ is hydrogen or an alkyl, alkenyl, aryl, alkaryl, aralkyl, cycloalkyl, or heterocyclic group such that the resultant copolymer is substantially water soluble, n=1–4, m=1–4 and x and y are average integer values sufficient to produce an average molecular weight for the copolymer between about 1,000 and 1,000,000.

Ring Closed CIE Polymers

A generic structure for the class of polymers derived from free radical or anionic polymerization of cyclic imino ethers such as 2-alkenyl-2-oxazolines, 2-alkenyl-2-oxazines, and other cyclic imino ethers having an alkene functional group is depicted as follows:

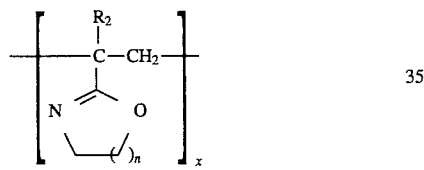

where $R_2$ is hydrogen or methyl, n ranges from one to four and x is an average number sufficient to produce an average molecular weight between 1,000 to about 1,000,000.

A preferred polymer produced from a free radical polymerization of a cyclic imino ether is poly(2-iso-propenyl-2-oxazoline) (hereinafter referred to as PiPpenOx). For the above structure, n=1, $R_2$ is a methyl group, and x is about 1,000 for PIPPENOX having an average molecular weight of about 110,000.

Copolymers and/or terpolymers comprising ring closed CIE polymers are also effective inhibitors of hydrate formation. For example, a preferred ring closed CIE copolymer may be prepared from 2-alkenyl cyclic imino ethers. The other monomer may be chosen from a class of monomers, including but not limited to, other alkenyl cyclic imino ethers, N-substituted acrylamides, vinylpyrrolidone, vinylcaprolactam, acrylates, N-vinyl amides, and vinyl carboxylates, such that the resultant copolymer and/or terpolymer is substantially water soluble.

Also, both the ring closed and ring opened CIE polymers can be used in various ratios with (1) each other, (2) other substantially water soluble homopolymers, including but not limited to, polyvinylpyrrolidone, polyvinylcaprolactam, polyacrylamides, or copolymers thereof or (3) other copolymers formed from such water soluble polymers and substantially water insoluble polymers, including but not limited to, polyvinylcarboxylates and polyacrylates. Generic structures for such homopolymers are shown below:

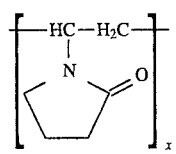

Polyvinylpyrrolidone

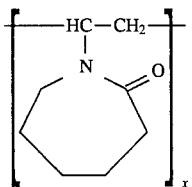

Polyvinylcaprolactam

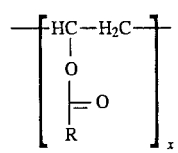

Polyvinylcarboxylate

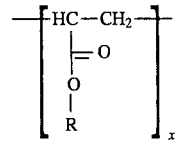

Polyacrylate

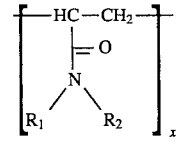

Polyacrylamide where R, $R_1$, or $R_2$ is a hydrogen, alkyl, aryl, alkylaryl, cycloalkyl, or heterocyclic group such that the resultant polymer is substantially water soluble and x = an integer value sufficient to produce an average molecular weight for the polymer between about 1,000 and 1,000,000.

Polyvinylpyrrolidone, polyvinylcaprolactam, polyvinylcarboxylate, polyacrylate, and polyacrylamide, and many of their copolymers are commercially available through Aldrich Chemical Company and other chemical manufacturers. PEOx is also commercially available. Other members of the polyalkeneimine class may be readily synthesized by processes known to those skilled in the art. The description below provides a general synthesis procedure and related experimental examples for demonstrating how other specific members of polyalkeneimine class would be prepared.

INHIBITOR SYNTHESIS

General Procedure

Cyclic imino ethers, molecules which contain the —N=C—O—group in a ring structure, are well known (see for example, Seeliger et al., *Angew. Chem. Int. Ed.*, Vol. 5, No. 10, 875–888 (1966)). They are commonly prepared by cyclization of N-substituted carboxamides or by metal catalyzed cyclization of organic nitriles and amino alcohols (U.S. Pat. No. 3,741,961). In particular, 2-alkyl-2-oxazolines are commonly synthesized by catalytic cyclodehydration of N-(β-hydroxyalkyl) carboxamides (U.S. Pat. No. 4,203,900 and U.S. Pat. No. 4,354,029). 2-Alkenyl-2-oxazolines are also well known and are commonly prepared by cyclization of N-(2-hydroxyalkyl)-2-alkyl-2-unsaturated amides (WO Patent 8908099) or dehydration of 2-(alpha-2-hydroxymethyl)ethyl-2-oxazolines.

Ring Opened CIE Polymers

N-acyl substituted polyalkyleneimines are commonly prepared through cationic ring-opening polymerization of cyclic imino ethers (U.S. Pat. No. 4,584,352 and references therein). The ring-opening polymerization is generally conducted in the presence of a cationic polymerization catalyst at a reaction temperature of 0°–200° C. Typical catalysts include strong mineral acids, Lewis acids such as aluminum trichloride, dialkyl sulfates, methyl tosylate, and other such materials. N-acyl substituted polyalkyleneimines, generally, have molecular weights ranging from about 1,000 to 1,000,000. Preferred molecular weights for the inhibitors of this invention are 20,000 to 500,000. A generic structure for these polymers is shown below, where R is a hydrogen, alkyl, aryl, alkylaryl, cycloalkyl, or heterocyclic group such that the resultant polymer is substantially water soluble, and where n=1–4:

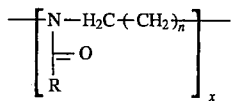

A preferred N-acyl substituted polyalkeneimine is poly(2-ethyl-2-oxazoline) (hereinafter referred to as PEOx).

Ring Closed Cyclic Imino Ether Polymers

Poly(2-alkenyl-2-oxazolines) are commonly prepared through free-radical polymerization of 2-alkenyl-2-oxazolines (T. Kagiya and T. Matsuda, Polymer Journal, 3(3), 307 (1972) for example). The free radical polymerization is commonly conducted in an inert solvent, such as benzene, at about 60 C using a free radical initiator such as 2,2'-azobis(2-methylpropionitrile) (AIBN).

Poly(2-alkenyl-2-oxazolines) may also be prepared through anionic polymerization of 2-alkenyl-2-oxazolines. The anionic polymerization is commonly conducted in a solvent, such as tetrahydrofuran, at about 5° C. using a anionic initiator such as butyl lithium.

CIE Copolymers and Terpolymers

Cyclic imino ethers can be block copolymerized (Kobayashi, S. et al., Macromolecules, 1986, 19, 535). Ring opened block copolymers are produced using the same cationic ring-opening chemistry used for preparation of the homopolymers. The polymerization, however, is done in stages. After polymerization of the first cyclic imino ether monomer is complete, a second cyclic imino ether monomer is added. This results in an AB-type block copolymer. Addition of a second aliquot of the first monomer after the second stage results in an ABA-type block copolymer. These block copolymers may possess both hydrophilic and lipophilic chains in the same molecule depending on the monomers employed. The hydrophilic/lipophilic balance is controlled by the relative proportions of the different monomers. This allows adjustment of the water solubility of the resultant polymer. A representative structure for an AB-type block copolymer of 2-alkyl-2-oxazoline is shown below:

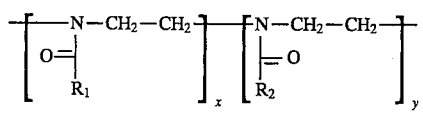

where $R_1$ and $R_2$ is hydrogen or an alkyl, aryl, alkenyl, alkaryl, aralkyl, cycloalkyl, or heterocyclic group such that the resultant block copolymer is substantially water soluble.

Ring closed block copolymers and terpolymers from cyclic imino ethers having an alkene functional group may also be synthesized by techniques known to those skilled in the art of polymer synthesis. An example of a commercially available ring closed terpolymer available from Nippon Shokubai, EPOCROS®WS-300, is depicted below:

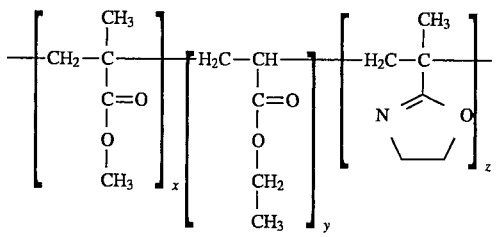

EPOCROS®WS-300 is a terpolymer of iso-propenyloxazoline, ethyl acrylate and methyl methacrylate. It is available as a 10% solution in water and with a molecular weight of about 87,000.

The following examples illustrate how certain ring opened and ring closed CIE polymers may be synthesized. Synthesis of other ring opened and ring closed CIE polymers will be apparent to those skilled in the art in light of synthesis procedures described below.

Laboratory Synthesis

Synthesis of 2-Propyl-2-oxazoline

A 100 mL flask equipped with reflux condenser was charged with 30.5 g of monoethanolamine and 1.0 g cobalt chloride hexahydrate. The mixture was warmed gently to dissolve the cobalt chloride hexahydrate. 34.5 g n-butyronitrile are added and refluxed gently for about 16 hours. Reflux temperature rises from 120° to 145° C., and ammonia was evolved. The crude mixture was vacuum distilled and the product was collected. The structure of the product, 2-propyl-2-oxazoline, was confirmed by carbon-13 nuclear magnetic resonance (NMR) spectroscopy.

Polymerization of 2-Propyl-2-oxazoline

A 1 L round bottomed flask equipped with reflux condenser, drying tube, stirrer, nitrogen inlet, addition funnel, and thermometer was purged. 500 mL dry acetonitrile was placed in the flask with 1.64 g methyl trifluoromethanesulfonate. 56.5 g 2-propyl-2-oxazoline are added dropwise with stirring at 0° C. After addition was complete, the reaction mixture was heated to 80° C. for 24–48 hours. The reaction mixture was poured into diethyl ether to precipitate the polymer. The polymer was redissolved in acetonitrile and precipitated again with diethyl ether to purify. The structure of the polymer, poly(2-propyl-2-oxazoline), was confirmed by carbon-13 NMR and gel permeation chromatography (GPC).

Preparation of a Block Copolymer of 2-Methyl-2-oxazoline and 2-Propyl-2-oxazoline Employing the procedure described above, 42.5 g 2-methyl-2-oxazoline (commercially available from Aldrich Chemical Company) was polymerized with 1.64 g methyl trifluormethanesulfonate in acetonitrile. After heating for 24 hours, 56.5 g 2-propyl-2-oxazoline was added dropwise to the reaction mixture. Heating was continued for another 24 hours. The reaction mixture was poured into diethyl ether to precipitate the resultant block copolymer which was confirmed using carbon-13 NMR and GPC.

Synthesis of Poly(2-isopropenyloxazoline)

2-Isopropenyloxazoline (300 mmol) and AIBN (1.8 mmol) were dissolved in 100 mL benzene. The mixture was heated under nitrogen at 60 C for 5 hr and 80 C for 2 hr. The mixture was cooled and poured into 1 L petroleum ether. The resulting polymer was filtered and dried in vacuo at 50 C.

INHIBITOR EVALUATION

Laboratory Evaluation Procedure

THF Testing

One method for evaluating an inhibitor's effectiveness is a bench-scale atmospheric pressure test often referred to as a tetrahydrofuran or THF test. A THF test typically uses 3 mL of tetrahydrofuran (THF) and 9 mL of ASTM synthetic seawater (SSW) containing the desired amount of inhibitor additive. The THF and SSW are placed in a capped test tube (15 mm OD×12.5 cm long) with a 0.95 centimeter stainless steel ball. Each tube is placed in a ferriswheel-type holder and placed in a cooling bath held near 0° C. The tubes are rotated to facilitate mixing of the samples. The tubes are monitored visually and recorded with a video camera. As hydrate formation proceeds the viscosity of THF/SSW solution increases. In many instances the solution's viscosity will become high enough for the ball to stop moving. The time required for the stainless steel ball to stop moving the full length of the tube is referred to as ball stop time or BST.

The BST is an approximate indication of an inhibitor's effectiveness. Because the THF/SSW solution has a $T_{eq}$ of about 2°–5° C. and THF is miscible with water, hydrate formation is substantially accelerated for the THF/SSW solution as compared to petroleum fluids conveyed in a pipeline or flowline under typical field conditions. Therefore, BSTs are useful for indicating which inhibitors may be effective under field applications. A BST for a THF/SSW solution with an inhibitor which is about three times the BST for a THF/SSW control solution with no inhibitor present indicates that the inhibitor demonstrates a threshold inhibition effect. Therefore, as used herein, a threshold inhibition concentration ("TIC") means the inhibitor concentration in a THF/SSW solution required to produce a BST which is about three times the BST for a THF/SSW control solution. Because the THF test results are sensitive to variations in the temperature at which the test is run, rotation frequency of the tube, clearances between the stainless steel ball and tube wall, etc., it is important to run a THF/SSW control solution with each inhibitor evaluation to ensure that an inhibitor's TIC is accurately measured and that a reliable threshold inhibition effect is observed.

Mini-loop Testing

A second method for evaluating an inhibitor's effectiveness uses a bench-scale high pressure apparatus referred to as a mini-loop apparatus. A mini-loop apparatus consists of a loop of stainless steel tubing with about a one-half inch inside diameter and about ten feet in length. The loop also has a transparent section for observing the fluid flow in the loop and the onset of hydrate formation in the loop. Fluid comprising about 40% by volume SSW solution having about 3.5% total ionized salts, 40% by volume hydrocarbon condensate (i.e., $C_6+$), and 20% by volume hydrocarbon gas mixture is circulated around the loop at constant pressure. The hydrocarbon gas mixute is comprised of about 76 mole % methane, 9 mole % ethane, 7 mole % propane, 5 mole % n-butane, 2 mole % iso-butane, and 1 mole % of $C_5+$. The inhibitor is typically injected into the loop as an aqueous solution to produce the desired weight percent concentration of inhibitor in the aqueous sea salt/gas solution. Generally, many hydrate inhibitors are evaluated at about 0.5 wt. % of the aqueous sea salt/gas solution.

The fluid is circulated at a constant velocity of about 2.5 feet/second. The loop and its pump lay in a controlled temperature water bath for controlling the temperature of the fluid circulating in the loop. The bath's water is circulated to ensure uniform temperature throughout the bath and rapid heat transfer between the bath water and the loop. As the loop temperature changes or as hydrates form the gas volume in the loop will change accordingly. Therefore, to maintain constant pressure in the loop a pressure compensating device is required. Such a device can be comprised of a gas cell and a hydraulic oil cell separated by a floating piston. So as the gas volume in the loop changes, oil may be added or removed from the oil cell to produce a commensurate addition or removal of gas to the loop. Mini-loop tests are typically run at a pressure of about 1,000 pounds per square inch gauge (p.s.i.g.). However, any pressure between 0 to 3,000 p.s.i.g. could be selected for evaluating an inhibitor's performance.

The temperature of the water bath is reduced at a constant rate, preferably about 6° F. per hour, from an initial temperature of about 70° F. At some temperature, clathrate hydrates begin to rapidly form. As the dissolved gas is used to form clathrate hydrates there is an abrupt and corresponding decrease in the volume of dissolved gas in the aqueous sea salt/gas solution. The temperature at which this abrupt decrease in the volume of dissolved gas is observed is known as the temperature of onset for hydrate formation ($T_{os}$). Recalling from the discussion above, the hydrate equilibrium dissociation temperature or $T_{eq}$ is the temperature below which hydrate formation is thermodynamically favored in an aqueous sea salt/gas solution without an inhibitor present. Therefore, another measure of an inhibitor's effectiveness is the difference between $T_{eq}$ and $T_{os}$ which is known as the inhibitor's subcooling, $T_{sub}$. Therefore, for a given pressure, the greater the subcooling the more effective the inhibitor. Typically, an aqueous sea salt/gas solution with no inhibitor present produces a $T_{sub}$ of about 6°–7° F.

THF and Mini-loop Test Results

TABLE 1

THF AND MINI-LOOP TEST RESULTS WITH POLYMERIC CYCLIC IMINO ETHER INHIBITORS

| INHIBITOR | CONC., WT % | BALL STOP TIME (MINUTES) | CONC., WT % | MINI-LOOP SUB-COOLING TEMP. (°F.) |
|---|---|---|---|---|
| None | — | 6 | — | 7 |
| PEOx (ring opened) | 0.05 | — | 0.05 | 8.7 |
| PEOx (ring opened) | 0.2 | 43.5 | 0.2 | 9.2 |
| PEOx (ring opened) | 0.5 | 93 | 0.5 | 10 and 11 |
| PiPOx (ring opened) | 0.5 | — | 0.5 | 21.2 |

TABLE 1-continued

THF AND MINI-LOOP TEST RESULTS WITH POLYMERIC CYCLIC IMINO ETHER INHIBITORS

| INHIBITOR | CONC., WT % | BALL STOP TIME (MINUTES) | CONC., WT % | MINI-LOOP SUB-COOLING TEMP. (°F.) |
| --- | --- | --- | --- | --- |
| w/ 3.5% MeOH | | | | |
| PiPpenOx (ring closed) | 0.5 | 9.5 | 0.5 | 21.7 |
| PiPpenOx terpolymer (ring closed) | 0.5 | 8.3 | 0.5 | 16.7 |

The results above show that certain polymers based produced from cyclic imino ethers do not have any THF threshold inhibition effect (i.e., greater than three times the BST for the uninhibited control), but nonetheless, do show a mini-loop threshold inhibition effect (i.e., a subcooling temperature at least 1.5° F. greater than the uninhibited control). For example, PiPpenOx and the PiPenOx terpolymer have a 9.5 and 8.3 minute BST, respectively, which are below the 18 minute BST for demonstrating a THF threshold inhibition effect, but a 21.7 and 16.7° F. mini-loop subcooling which is well above the 8.5° F. mini-loop subcooling required for demonstrating a mini-loop threshold inhibition effect. Currently, there is no apparent method for accurately predicting an inhibitor's mini-loop performance based on its performance under THF testing. Mini-loop testing, however, more closely simulates the conditions, such as flow, pressure, and gas mixture, which are likely to be found in most field applications of the inhibitor. Consequently, mini-loop test results are a more reliable indicator than THF test results of an inhibitor's potential effectiveness under typical field applications.

The data above suggests that ring closed CIE polymers may be generally more effective inhibitors than ring opened CIE polymers. PiPenOx is currently considered the most preferred inhibitor based on both its cost and range of subcooling performance. However, under various applications certain ring opened CIE polymers may demonstrate cost effective inhibitor performance.

The means and method for practicing the invention and the best mode contemplated for practicing the invention have been described. It is to be understood that the foregoing is illustrative only and that other means and techniques can be employed without departing from the true scope of the invention defined in the following claims.

We claim:

1. A method for inhibiting the formation of clathrate hydrates in a fluid having hydrate forming constituents, said method comprising:
   treating said fluid with an inhibitor mixture having,
   a) an inhibitor comprising a substantially water soluble ring closed cyclic imino ether polymer, and
   b) a liquid used for introducing said inhibitor into said fluid.

2. The method of claim 1 wherein said said ring closed cyclic imino ether polymer is selected from the group consisting of poly(2-alkenyl-2-oxazoline) and poly(2-alkenyl-2-oxazine) and copolymers and terpolymers thereof.

3. The method of claim 2 wherein said inhibitor mixture further comprises a substantially water soluble polymer selected from the group consisting of homopolymers of polyacrylamide, polyvinylpyrrolidone, polyvinylcaprolactam, copolymers thereof, and copolymers formed from said homopolymers and substantially water insoluble polymers selected from the group consisting of polyvinylcarboxylate and polyacrylate.

4. The method of claim 2 wherein said liquid is selected from the group consisting of an alcohol, water, and brine.

5. A method for inhibiting the formation of clathrate hydrates in a pipe containing a petroleum fluid stream having hydrate forming constituents, said method comprising:
   a) producing an inhibitor mixture having,
      1) an inhibitor comprising a substantially water soluble ring closed cyclic imino ether polymer, and
      2) a liquid used for used for introducing said inhibitor into said fluid; and
   b) introducing said inhibitor mixture into said petroleum fluid stream, thereby inhibiting the formation of a hydrate restriction in said pipe.

6. A method for inhibiting the formation of clathrate hydrates in a fluid having hydrate forming constituents, said method comprising treating said fluid with an inhibitor comprising a substantially water soluble polymer produced from a ring closed cyclic imino ether.

7. The method of claim 6 wherein said ring closed cyclic imino ether polymer is selected from the group consisting of poly(2-alkenyl-2-oxazoline) and poly(2-alkenyl -2-oxazine) and copolymers and terpolymers thereof.

8. The method of claim 6 wherein said inhibitor further comprises a substantially water soluble polymer selected from the group consisting of homopolymers of polyacrylamide, polyvinylpyrrolidone, polyvinylcaprolactam, copolymers thereof and copolymers formed from said homopolymers and substantially water insoluble polymers selected from the group consisting of polyvinylcarboxylate and polyacrylate.

* * * * *